(12) United States Patent
Feng et al.

(10) Patent No.: US 12,073,321 B2
(45) Date of Patent: Aug. 27, 2024

(54) METHOD AND APPARATUS FOR TRAINING IMAGE CAPTION MODEL, AND STORAGE MEDIUM

(71) Applicant: Tencent Technology (Shenzhen) Company Limited, Shenzhen (CN)

(72) Inventors: Yang Feng, Shenzhen (CN); Lin Ma, Shenzhen (CN); Wei Liu, Shenzhen (CN); Jiebo Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 823 days.

(21) Appl. No.: 17/075,618

(22) Filed: Oct. 20, 2020

(65) Prior Publication Data

US 2021/0034981 A1    Feb. 4, 2021

Related U.S. Application Data

(63) Continuation of application No. PCT/CN2019/094891, filed on Jul. 5, 2019.

(30) Foreign Application Priority Data

Oct. 8, 2018   (CN) .......................... 201811167476.9

(51) Int. Cl.
*G06N 3/08*       (2023.01)
*G06N 3/045*      (2023.01)
*G06N 3/047*      (2023.01)

(52) U.S. Cl.
CPC .............. *G06N 3/08* (2013.01); *G06N 3/045* (2023.01); *G06N 3/047* (2023.01)

(58) Field of Classification Search
CPC ........... G06N 3/02; G06N 3/047; G06N 3/045
See application file for complete search history.

(56) References Cited

U.S. PATENT DOCUMENTS 10,089,742 B1   10/2018   Lin et al.

FOREIGN PATENT DOCUMENTS

CN   105654135 A   6/2016
CN   106446782 A   2/2017
(Continued)

OTHER PUBLICATIONS

M. Yang et al., "Multitask Learning for Cross-Domain Image Captioning," in IEEE Transactions on Multimedia, vol. 21, No. 4, pp. 1047-1061, Apr. 2019, ad IEEE explore Sep. 11, 2018 (Year: 2018).*

(Continued)

*Primary Examiner* — Kakali Chaki
*Assistant Examiner* — Johnathan R Germick
(74) *Attorney, Agent, or Firm* — Morgan, Lewis & Bockius LLP

(57) ABSTRACT

Embodiments of this application disclose a method for training an image caption model, the image caption model including an encoding convolutional neural network (CNN) and a decoding recurrent neural network (RNN). The method includes: obtaining an image eigenvector of an image sample by using the encoding CNN; decoding the image eigenvector by using the decoding RNN, to obtain a sentence used for describing the image sample; determining a matching degree between the sentence obtained through decoding and the image sample and a smoothness degree of the sentence obtained through decoding, respectively; and adjusting the decoding RNN according to the matching degree and the smoothness degree.

18 Claims, 9 Drawing Sheets

(56) References Cited

FOREIGN PATENT DOCUMENTS

| CN | 107480144 A | 12/2017 |
| --- | --- | --- |
| CN | 107491764 A | 12/2017 |
| CN | 107657008 A | 2/2018 |
| CN | 107832292 A | 3/2018 |
| CN | 108228686 A | 6/2018 |
| CN | 108288067 A | 7/2018 |
| CN | 108416059 A | 8/2018 |

OTHER PUBLICATIONS

Junhua Mao, Wei Xu, Yi Yang, Jiang Wang, Zhiheng Huang, & Alan Yuille. (2015). Deep Captioning with Multimodal Recurrent Neural Networks (m-RNN). (Year: 2015).*
Ting Yao, Yingwei Pan, Yehao Li, & Tao Mei. (2017). Incorporating Copying Mechanism in Image Captioning for Learning Novel Objects. (Year: 2017).*
Y. Yang et al., "Video Captioning by Adversarial LSTM," in IEEE Transactions on Image Processing, vol. 27, No. 11, pp. 5600-5611, Nov. 2018, doi: 10.1109/TIP.2018.2855422. IEEE Xplore Jul. 12, 2018 (Year: 2018).*
Josiah Wang, Pranava Madhyastha, & Lucia Specia. (2018). Object Counts! Bringing Explicit Detections Back into Image Captioning. (Year: 2018).*
Bairui Wang et al., "Reconstruction Network for Video Captioning", arxiv.org, Mar. 30, 2018, XP080860642, 10 pgs.
Chen Chen et al., "Improving Image Captioning with Conditional Generative Adversarial Nets", arxiv.org, May 18, 2018, XP080879672, 12 pgs.
Database Medline [Online], Jul. 12, 2018, Yang Yang et al., "Video Captioning by Adversarial LSTM", XP002805782, 1 pg.
Extended European Search Report, EP19870771.3, Mar. 11, 2022, 10 pgs.
Shiyang Yan et al., "Image Captioning using Adversarial Networks and Reinforcement Learning", 2018 24$^{th}$ International Conference on Pattern Recognition (ICPR), IEEE, Aug. 20, 2018, 6 pgs.
Yang Yang et al., "Video Captioning by Adversarial LSTM", IEEE Transactions on Image Processing, vol. 27, No. 11, Nov. 2018, 12 pgs.
Liu Chang et al., "Image Caption Based on Image Semantic Similarity Network", Computer Applications and Software, School of Computer Science, Fudan University, China, vol. 35, No. 1, Jan. 31, 2018, 7 pgs.
Tencent Technology, ISR, PCT/CN2019/094891, Sep. 26, 2019, 3 pgs.
Tencent Technology, WO, PCT/CN2019/094891, Sep. 26, 2019, 3 pgs.
Tencent Technology, IPRP, PCT/CN2019/094891, Apr. 8, 2021, 4 pgs.
Tencent Technology, European Office Action, EP 19870771.3, Oct. 23, 2023, 5 pgs.

* cited by examiner

METHOD AND APPARATUS FOR TRAINING IMAGE CAPTION MODEL, AND STORAGE MEDIUM

CROSS REFERENCE TO RELATED APPLICATIONS

This application is a continuation application of PCT Patent Application No. PCT/CN2019/094891, entitled "IMAGE DESCRIPTION MODEL TRAINING METHOD AND DEVICE, AND STORAGE MEDIUM" filed on Jul. 5, 2019, which claims priority to Chinese Patent Application No. 201811167476.9, filed with the State Intellectual Property Office of the People's Republic of China on Oct. 8, 2018, and entitled "METHOD AND APPARATUS FOR TRAINING IMAGE CAPTION MODEL, AND STORAGE MEDIUM", all of which are incorporated herein by reference in their entirety.

FIELD OF THE TECHNOLOGY

This application relates to the field of artificial intelligence (AI) technologies, and in particular, to a method and an apparatus for training an image caption model, and a storage medium.

BACKGROUND OF THE DISCLOSURE

Image caption means automatically generating a paragraph of descriptive text according to an image, that is, picture talking. To generate the descriptive text corresponding to the image, objects in the image first need to be detected, mutual relationships between the objects are understood, and then expressed by using appropriate language.

An image caption technology may be used for an image retrieval service, to help the visually impaired to understand an image, or may be used for image scene classification and automatic summary and classification of images in a user album. The image caption technology may also be used in teaching of infants, to help the infants to learn to speak and recognize objects and behaviors in an image.

In some technologies, manually marked image-sentence may be adopted to train an image caption model. In addition, a semi-supervised learning technology may alternatively be used, to use images and sentences having no correspondence in a model training process. Sentence data having no correspondence may be used for training a language model. A separate image set may also be used for training an object recognition model. A domain adaptation method may alternatively be used, to transfer pairs of images and sentence data on one data domain to another data domain. On a target domain, only images and sentences having no correspondence are used.

SUMMARY

Some embodiments of this application provide a method and an apparatus for training an image caption model, and a storage medium, to avoid dependence on pairs of image samples and sentence samples, and improve image caption accuracy.

The embodiments of this application provide a method for training an image caption model, performed by an electronic device. The image caption model includes an encoding convolutional neural network (CNN) and a decoding recurrent neural network (RNN). The method includes:

obtaining an image eigenvector of an image sample by using the encoding CNN;

decoding the image eigenvector by using the decoding RNN, to obtain a sentence used for describing the image sample;

determining a matching degree between the sentence obtained through decoding and the image sample and a smoothness degree of the sentence obtained through decoding, respectively; and adjusting the decoding RNN according to the matching degree and the smoothness degree.

The embodiments of this application provide an apparatus for training an image caption model, the image caption model including an encoding CNN and a decoding RNN. The apparatus includes:

an encoding module, configured to obtain an image eigenvector of an image sample by using the encoding CNN;

a decoding module, configured to decode the image eigenvector by using the decoding RNN, to obtain a sentence used for describing the image sample; and an adjustment module, configured to: determine a matching degree between the sentence obtained through decoding and the image sample and a smoothness degree of the sentence obtained through decoding, respectively, and adjust the decoding RNN according to the matching degree and the smoothness degree.

The embodiments of this application further provide an electronic device, including:

one or more processors; and a memory connected to the one or more processors, the memory storing a plurality of computer programs, the plurality of computer programs being executable by the one or more processors to perform the operations in any method for training an image caption model according to the embodiments of this application.

The embodiments of this application further provide a non-transitory computer-readable storage medium, the storage medium storing a plurality of computer programs, and the plurality of computer programs being executable by one or more processors of an electronic device to perform the foregoing method.

In the technical solutions provided in the embodiments of this application, a decoding RNN is trained and adjusted according to a smoothness degree of a sentence obtained by the decoding RNN through decoding and a matching degree between the sentence obtained through decoding and an image sample. In this way, in a training process of an image caption model, pairs of image samples and sentence samples are not required to be used as a training set, so that dependence on pairs of image samples and sentence samples is eliminated, thereby expanding a range of the training set, and improving accuracy of the image caption model.

BRIEF DESCRIPTION OF THE DRAWINGS

To describe the technical solutions of the embodiments of this application or the related art more clearly, the accompanying drawings required for describing the embodiments or the related art are briefly introduced below. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
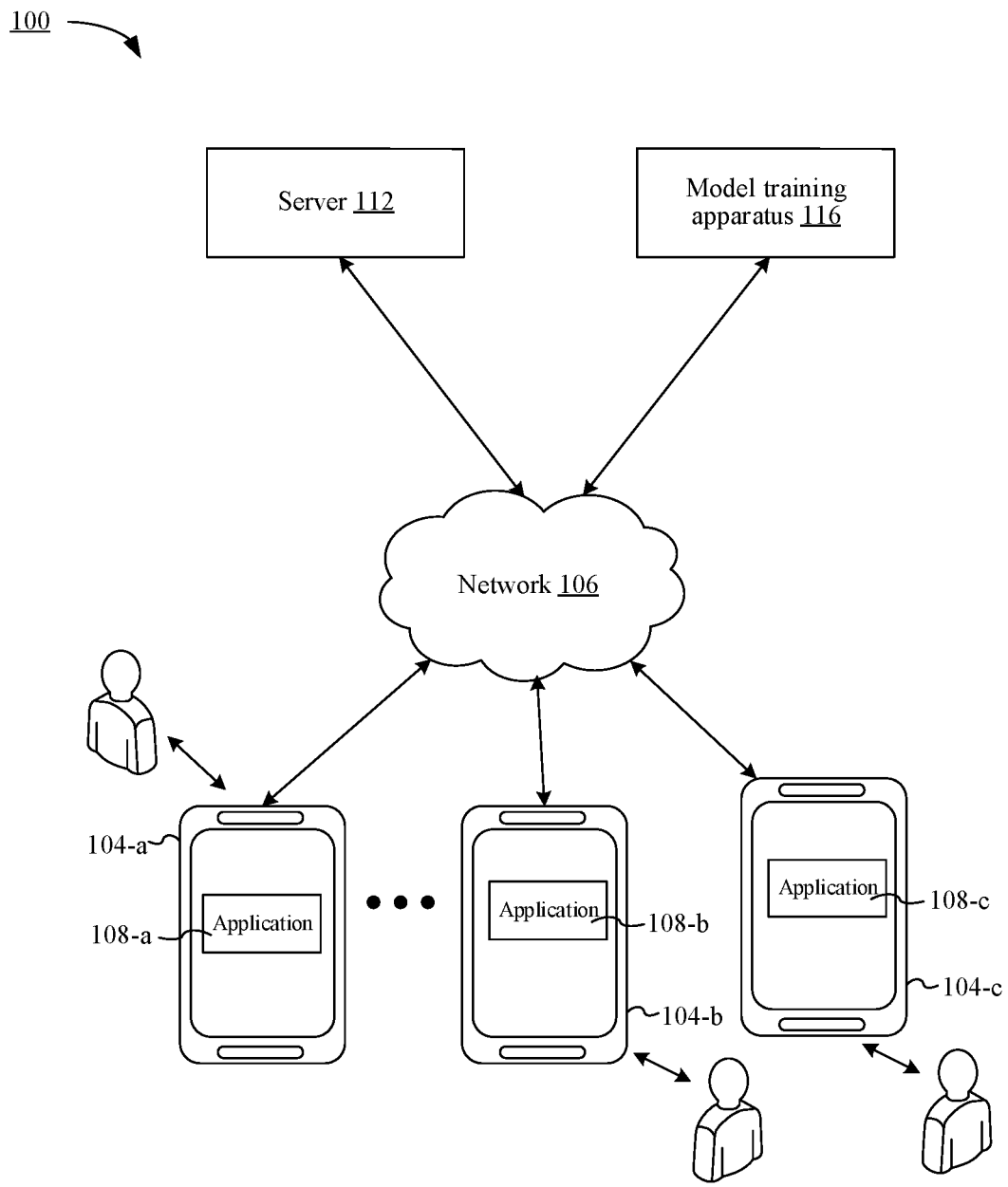
FIG. 1 is a schematic diagram of an operating environment according to some embodiments of this application.

To make the technical solutions and the advantages of this application clearer and more comprehensible, this application is further described below in detail with reference to the accompanying drawings and embodiments.

For brief and intuitive description, the solutions of this application are illustrated below by describing several typical embodiments. However, not all implementations are shown herein. Many details in the embodiments are used merely for helping understand the solutions of this application, and the technical solutions of this application may not be limited by these details during implementation. To avoid unnecessarily obscuring the solutions of this application, some implementations are not described in detail, but only frames are provided. In the following description, "include" refers to "include, but is not limited to", and "according to . . . " refers to "at least according to . . . , but not limited to only according to . . . ". In the specification and claims, "including" means at least including to some extent and is to be interpreted as including a feature in addition to a feature mentioned later.

Currently, due to successful application of deep learning (DL) in the field of vision, researchers also introduce DL to the field of image caption, to generate and describe a sentence by using a neural machine translation method.

DL is one of the technical and research fields of machine learning, and implements artificial intelligence (AI) in a computer system by establishing an artificial neural network having a hierarchical structure.

An AI system refers to a computer system showing an intelligent behavior. Functions of the AI system include learning, maintaining a large quantity of knowledge bases, executing capabilities of deduction and application analysis, distinguishing relationships between realities, exchanging ideas with others, understanding communication between others, sensing and understanding statuses, and the like.

Different from an intelligent system based on a rule, the AI system can enable a machine to be continuously improved through its learning and determining. The AI system creates new knowledge by searching data for a previously unknown mode, and drives a solution by learning a data mode. In continual use, a recognition rate of the AI system can be improved, and the AI system can understand a taste of a user more accurately.

A neural network is usually used in the AI system. The neural network is a computer system simulating a human neural network in design, construction, and configuration. A neural network architecture is formed by an input layer, an output layer, and one or more hidden layers. The input layer inputs data into the neural network. The output layer generates a guess result. The hidden layer assists in information propagation. The systems learn to process tasks or make decisions by researching on examples. The neural network or artificial neural network is based on a set of connection units referred to as neurons or artificial neurons. Each connection between the neurons may transmit a signal from one neuron to the other neuron.

In some embodiments of this application, an image caption model based on DL may adopt an "encoding-decoding" process in which an image eigenvector is first extracted by using a CNN, and an entire image is encoded into an eigenvector of a fixed dimension; and then decoding is performed by using an RNN, to generate related words one by one in chronological order.

The CNN is a feedforward neural network that perform feature extraction on an image layer by layer directly from a pixel feature of a bottom layer of the image, and is an implementation model commonly used by an encoder and responsible for encoding an image into a vector.

The RNN is a neural network having a fixed weight, an external input, and an internal state, and may be regarded as behavior dynamics using the weight and the external input as parameters and related to the internal state. The RNN is an implementation model commonly used by a decoder, and is responsible for translating an image vector generated by an encoder into a text caption of an image.

Currently, both a semi-supervised method and a domain adaptation method are to add images and sentences having no correspondence based on a supervised learning method, to improve the result. The methods still require pairs of images and sentence data to participate in model training. Annotating a corresponding sentence caption for an image is quite a time- and labor-consuming process. A training set not only needs to be large enough, but also needs to be as diversified as possible. However, annotating a corresponding sentence caption for an image is quite a time- and labor-consuming process, and if a size of the training set is reduced, image caption accuracy is also reduced.

Therefore, the embodiments of this application provide a method for training an image caption model, which can avoid dependence on pairs of image samples and sentence samples, and expand a range of the training set, thereby improving accuracy of the image caption model.

The method for training an image caption model provided in the embodiments of this application may be performed by any computer device having a data processing capability, for example, a terminal device or a server. After training of the image caption model is completed according to the method provided in the embodiments of this application, the trained image caption model may be applied to the server or the terminal device, and configured to generate a corresponding caption sentence for a specified image. For example, the trained image caption model may provide an image retrieval service to a user, and automatically classify images in a user album.

FIG. 1 is a schematic diagram of an operating environment 100 according to some embodiments of this application. As shown in FIG. 1, the method for training an image caption model in the embodiments of this application may be performed by a model training apparatus 116.

In some embodiments of this application, the model training apparatus 116 is configured to: train an image caption model to obtain a trained image caption model, and provide the trained image caption model to a server 112, for the server 112 to provide an image caption generation service to a terminal device 104, for example, providing an image retrieval service to a user; or provide the trained image caption model to the terminal device 104, for the terminal device 104 to provide an image caption generation service to a user, for example, automatically classifying images in a user album.

In some embodiments, the model training apparatus 116 may be implemented on one or more independent data processing apparatuses or distributed computer networks, or may be integrated in the server 112 or the terminal device 104.

In some embodiments, when the server 112 provides an image caption generation service to the terminal device 104, as shown in FIG. 1, a plurality of users are connected to the server 112 through a network 106 by using applications 108-a to 108-c executed on respective terminal devices (for example, terminal devices 104-a to 104-c). The server 112 provides the image caption generation service to the terminal device 104, for example, receiving an image provided by the user, generating a corresponding caption sentence for the image according to an image description generation model in the server 112, and returning the generated caption sentence to the terminal device 104.

In some embodiments, the terminal device 104 is a terminal device having a data computing processing function and includes, but is not limited to, a smartphone, a palm computer, a tablet computer, and a smart TV (installed with a communication module). These communication terminals are all installed with operating systems, which include, but are not limited to: an Android operating system, a Symbian operating system, a Windows mobile operating system, an Apple's iPhone OS operating system, and the like.

In some embodiments, the network 106 may include a local area network (LAN) and a wide area network (WAN) such as the Internet. The network 106 may be implemented by using any known network protocol, including various wired or wireless protocols.

In some embodiments, the server 112 may be implemented on one or more independent data processing apparatuses or distributed computer networks.

The model training apparatus 116 provided in the embodiments of this application is described below with reference to FIG. 2A and FIG. 2B.

Figure 2A:
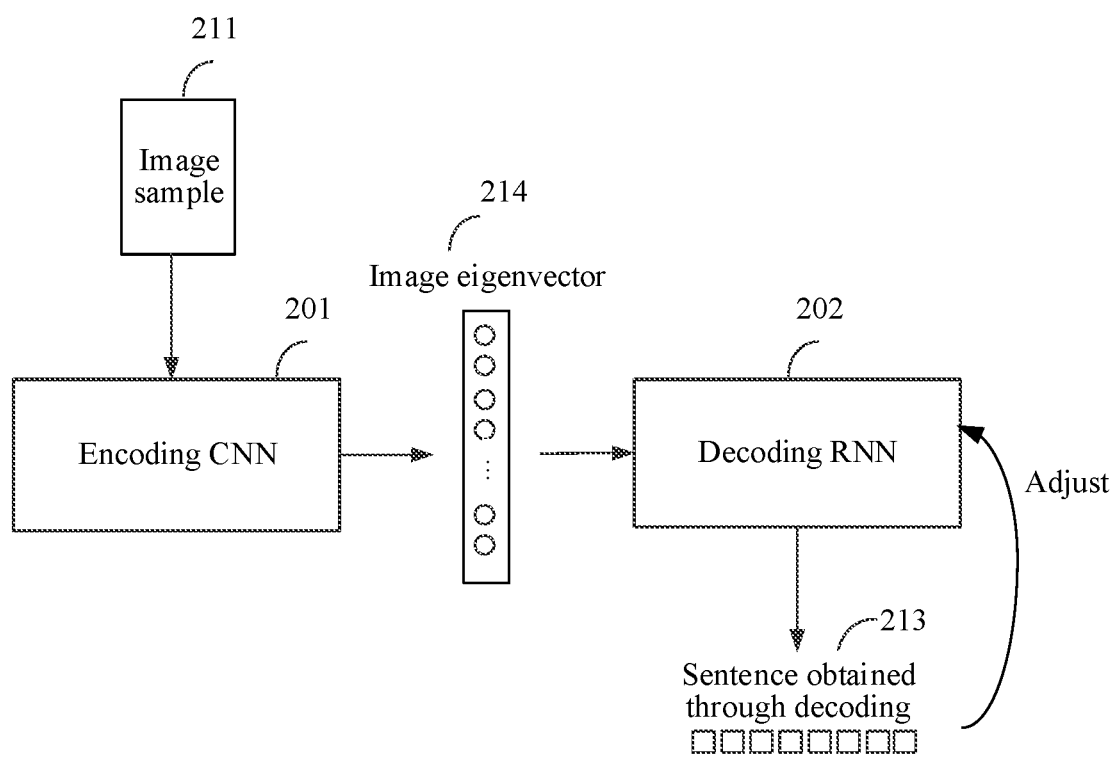
FIG. 2A and FIG. 2B are schematic structural diagrams of a model training apparatus 116 according to embodiments of this application.
Figure 2B:
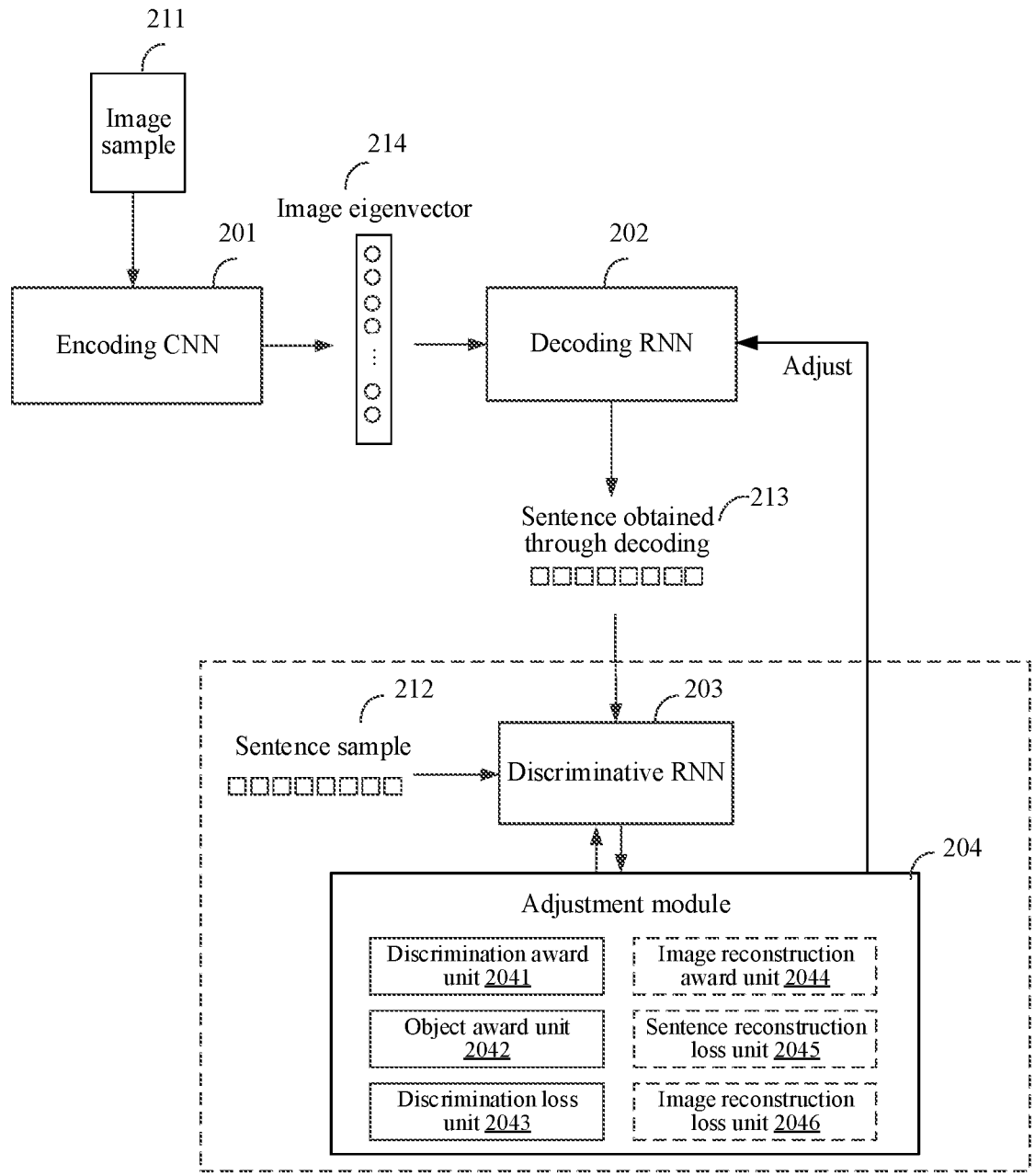

FIG. 2A and FIG. 2B are schematic structural diagrams of the model training apparatus 116 according to some embodiments of this application. As shown in FIG. 2A, the model training apparatus 116 includes: an encoding CNN 201 and a decoding RNN 202.

The encoding CNN 201 is used for extracting an image eigenvector 214 for an inputted image sample 211. In this application, the terms "eigenvector" or "image eigenvector" may also be referred to as "image feature vector," which is used interchangeably with "eigenvector" or "image eigenvector".

In some embodiments, a CNN may be used as the encoding CNN 201, to extract the image eigenvector 214 of the image sample 211. For example, an Inception-X network or a ResNet network may be used.

In some embodiments, the encoding CNN 201 may be a pre-trained encoding network.

The decoding RNN 202 is used for decoding the image eigenvector 214 into a sentence 213 used for describing the image sample. In some embodiments, the decoding RNN 202 may be implemented by a long short term memory network (LSTM), or may be implemented in other manners such as a gate recurrent unit (GRU).

The LSTM is a time RNN used for processing and predicting important events having an interval or delay for a relatively long time in a time sequence, and is a special RNN.

Because the image sample used in the embodiments of this application has no corresponding sentence sample, training of the decoding RNN 202 is implemented in the following manner:
  performing training adjustment on the decoding RNN 202 according to a matching degree between the sentence 213 obtained by the decoding RNN 202 through decoding and the image sample 211; and
  performing training adjustment on the decoding RNN 202 according to a smoothness degree of the sentence 213 obtained through decoding.

Referring to FIG. 2B, in some embodiments, to implement the training of the decoding RNN 202, the model training apparatus 116 further includes: a discriminative RNN 203 and an adjustment module 204.

The discriminative RNN 203 is used for: discriminating, after the decoding RNN 202 outputs a sentence, a smoothness degree of the sentence, and providing a discrimination result to the adjustment module 204. The adjustment module 204 adjusts the decoding RNN 202 according to the discrimination result of the discriminative RNN 203.

The adjustment module 204 is configured to adjust the decoding RNN 202, which includes: adjusting the decoding RNN 202 according to the matching degree between the sentence 213 obtained through decoding and the image sample 211, and adjusting the decoding RNN 202 according to the smoothness degree of the sentence 213 obtained through decoding. In addition, the adjustment module 204 also performs training adjustment on the discriminative RNN 203, to enable the discriminative RNN 203 to discriminate a smoothness degree of an inputted sentence more accurately.

In some embodiments, the adjustment module 204 may include: a discrimination award unit 2041, an object award unit 2042, and a discrimination loss unit 2043. The discrimination award unit 2041 and the object award unit 2042 are configured to adjust the decoding RNN 202, and the discrimination loss unit 2043 is configured to adjust the discriminative RNN 203.

The discrimination award unit 2041 is configured to adjust the decoding RNN 202 according to the smoothness degree of the sentence obtained through decoding that is determined by the discriminative RNN 203.

In some embodiments, the smoothness degree may be a score for the sentence obtained by the decoding RNN through decoding.

The object award unit 2042 is configured to adjust the decoding RNN 202 according to a matching degree between each word in the sentence obtained by the decoding RNN 202 through decoding and the image sample 211.

In some embodiments, for the image sample 211, objects included in the image sample and a score corresponding to each object may be pre-detected according to an object detection model. Then, the object award unit 2042 compares a word included in the sentence obtained through decoding with the objects detected by the object detection model, to obtain a matching degree between the word obtained through decoding and the image sample 211, and then performs adjustment and optimization on the decoding RNN 202 according to the matching degree.

The discrimination loss unit 2043 is configured to: determine a discrimination loss according to a discrimination result from the discriminative RNN 203 for a sentence sample 212 and the sentence 213 obtained by the decoding RNN 202 through decoding, and adjust the discriminative RNN 203 according to the discrimination loss.

In some embodiments of this application, to enable the discriminative RNN 203 to perform a discrimination operation as accurately as possible, a manually written sentence sample 212 is further required to train the discriminative RNN 203, to make the discriminative RNN 203 output 1 when a manually written smooth sentence sample 212 is inputted into the discriminative RNN, and the discriminative RNN output any value between 0 and 1 when a sentence generated by the decoding RNN 202 is inputted. A larger value outputted by the discriminative RNN indicates a higher smoothness degree of a sentence, that is, a smoother sentence.

In some embodiments, a sentence sample 212 and a sentence 213 obtained by the decoding RNN 202 through decoding may be alternately inputted into the discriminative RNN 203, to obtain a discrimination loss according to scores for the sentence sample 212 and the sentence 213 from the discriminative RNN 203; and the discriminative RNN is adjusted according to the obtained discrimination loss.

In some embodiments, in addition to the discrimination award unit 2041, the object award unit 2042, and the discrimination loss unit 2043, to further improve accuracy of the image caption model, the adjustment module 204 may further include: an image reconstruction award unit 2044, a sentence reconstruction loss unit 2045, and an image reconstruction loss unit 2046.

The image reconstruction award unit 2044 is configured to: reconstruct an image according to the sentence obtained through decoding, determine a similarity degree between the reconstructed image and the image sample 211, and perform optimization and adjustment on the decoding RNN 202 according to the similarity degree.

For example, a sentence eigenvector corresponding to the sentence obtained through decoding may be obtained by using the discriminative RNN 203; the sentence eigenvector is mapped to an image feature space, to obtain a corresponding image eigenvector; and the image eigenvector is compared with the image eigenvector 214 obtained by the encoding CNN 201, to obtain the similarity degree.

In some embodiments, the image reconstruction award unit 2044 may map the sentence eigenvector to the image feature space by using a fully-connected layer, to obtain the reconstructed image eigenvector.

The sentence reconstruction loss unit 2045 is configured to: obtain a sentence eigenvector corresponding to the sentence sample 212, and map the sentence eigenvector corresponding to the sentence sample 212 to an image feature space by using a fully-connected layer, to obtain a corresponding image eigenvector; input the image eigenvector into the decoding RNN 202, to reconstruct a sentence; and compare the reconstructed sentence with the sentence sample 212, and perform optimization and adjustment on the decoding RNN 202 according to a comparison result.

The image reconstruction loss unit 2046 is configured to: reconstruct an image according to the sentence obtained through decoding, determine a difference degree between the reconstructed image and the image sample, and perform optimization and adjustment on the discriminative RNN according to the difference degree.

In some embodiments, the image reconstruction loss unit 2046 may obtain, by using the discriminative RNN 203, the sentence eigenvector corresponding to the sentence obtained through decoding; map the sentence eigenvector to the image feature space, to obtain the corresponding image eigenvector; compare the image eigenvector obtained through mapping with the image eigenvector 214 obtained by the encoding CNN 201 to obtain the difference degree between the reconstructed image and the image sample, that is, an image reconstruction loss; and perform optimization and adjustment on the discriminative RNN 203 according to the image reconstruction loss.

By using the foregoing units, the adjustment module 204 may perform optimization and adjustment on the decoding RNN 202 and the discriminative RNN 203, thereby improving accuracy of the decoding RNN 202 and the discriminative RNN 203.

Figure 3:
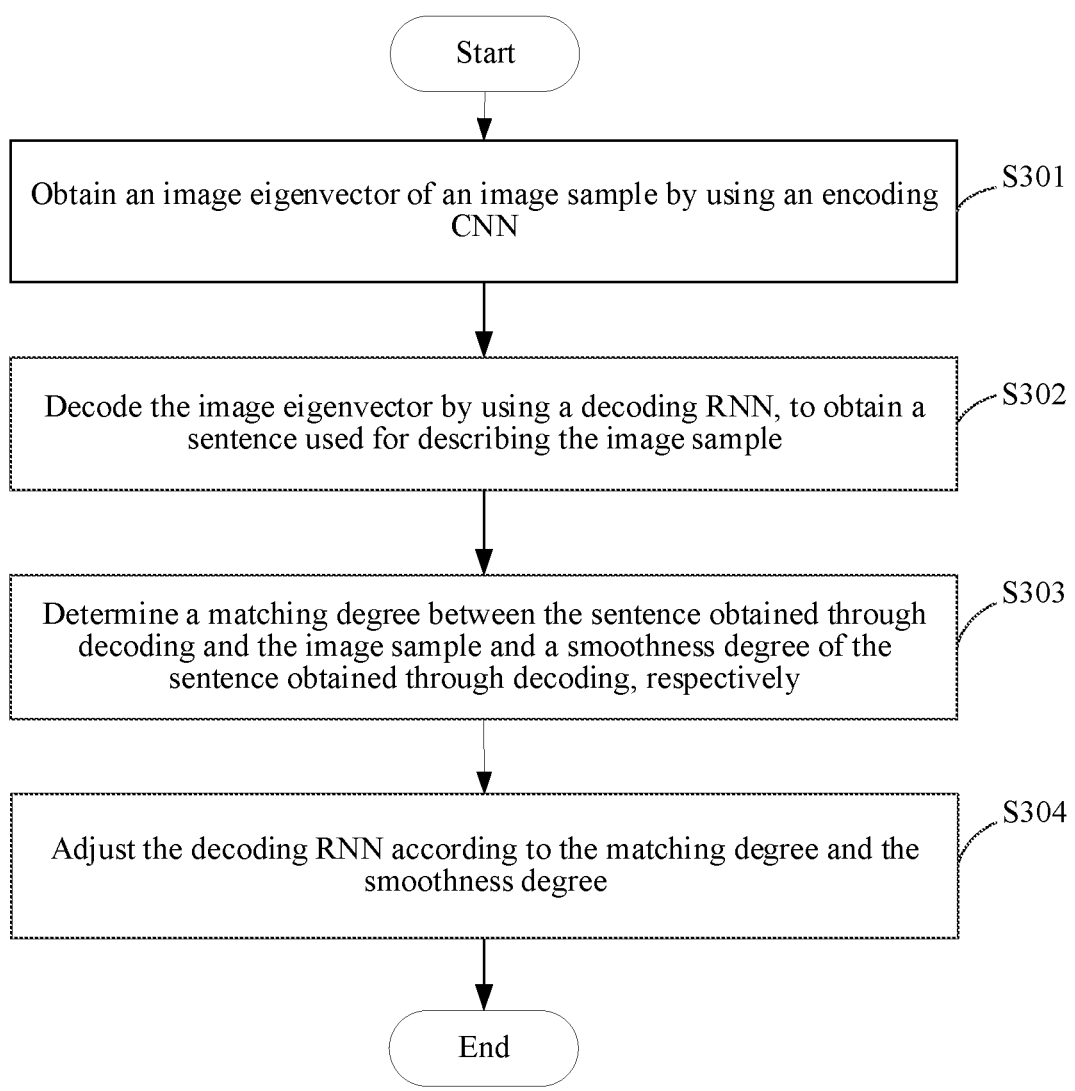
FIG. 3 is a flowchart of a method for training an image caption model according to some embodiments of this application.

The method for training an image caption model provided in the embodiments of this application is described below with reference to FIG. 3. FIG. 3 is a flowchart of the method for training an image caption model according to the embodiments of this application. The image caption model includes an encoding CNN and a decoding RNN. As shown in FIG. 3, the method includes the following steps:

S301: Obtain an image eigenvector (or image feature vector) of an image sample by using the encoding CNN.

In some embodiments, a pre-trained encoding CNN may be adopted to obtain the image eigenvector corresponding to the image sample. In addition, after the image eigenvector of the image sample is obtained, dimension reduction may be further performed on the image eigenvector, to obtain a dimension-reduced image eigenvector.

S302: Decode the image eigenvector by using the decoding RNN, to obtain a sentence used for describing the image sample.

In some embodiments, the dimension-reduced image eigenvector may be inputted into the decoding RNN, and the decoding RNN decodes the dimension-reduced image eigenvector, to obtain the sentence used for describing the image sample.

In some embodiments, the sentence includes a plurality of words; and the decoding the image eigenvector by using the decoding RNN, to obtain a sentence used for describing the image sample includes:
- inputting the image eigenvector into the decoding RNN, to obtain noutputted probability distributions, n being a positive integer and representing a length of the sentence obtained through decoding; and
- respectively selecting, for each probability distribution, a word corresponding to a maximum probability value in the probability distribution from a word list, to form the sentence used for describing the image sample.

S303: Determine a matching degree between the sentence obtained through decoding and the image sample and a smoothness degree of the sentence obtained through decoding, respectively.

In some embodiments, objects included in the image sample and weights corresponding to the objects may be determined according to a detection result for the image sample from an object detection model.

S304: Adjust the decoding RNN according to the matching degree and the smoothness degree.

A matching operation is performed on words included in the sentence obtained through decoding and the objects included in the image sample, and the matching degree between the sentence obtained through decoding and the image sample is determined according to a result of the matching and the weights corresponding to the objects. Then, the decoding RNN is adjusted according to the matching degree.

In some embodiments, the smoothness degree of the sentence obtained through decoding may be determined by using various methods. For example, the sentence obtained through decoding may be inputted into a discriminative RNN, and the smoothness degree of the sentence obtained through decoding is determined according to a first output of the discriminative RNN at each time point.

For example, if the sentence obtained by the decoding RNN through decoding is smoother, there is a higher probability that the discriminative RNN considers the sentence to be a manually written smooth sentence, that is, to have a higher smoothness degree.

In some embodiments, to improve discrimination accuracy of the discriminative RNN, the discriminative RNN needs to be trained according to a sentence sample.

For example, a sentence sample may be inputted into the discriminative RNN, and a second output of the discriminative RNN at each time point is obtained; and the discriminative RNN is adjusted according to the first output and the second output of the discriminative RNN at each time point.

In the technical solutions provided in the embodiments of this application, a decoding RNN is trained and adjusted according to a smoothness degree of a sentence obtained by the decoding RNN through decoding and a matching degree between the sentence obtained through decoding and an image sample. In this way, in a training process of an image caption model, pairs of image samples and sentence samples are not required to be used as a training set, so that dependence on pairs of image samples and sentence samples is eliminated, thereby expanding a range of the training set, and improving accuracy of the image caption model.

Figure 4A:
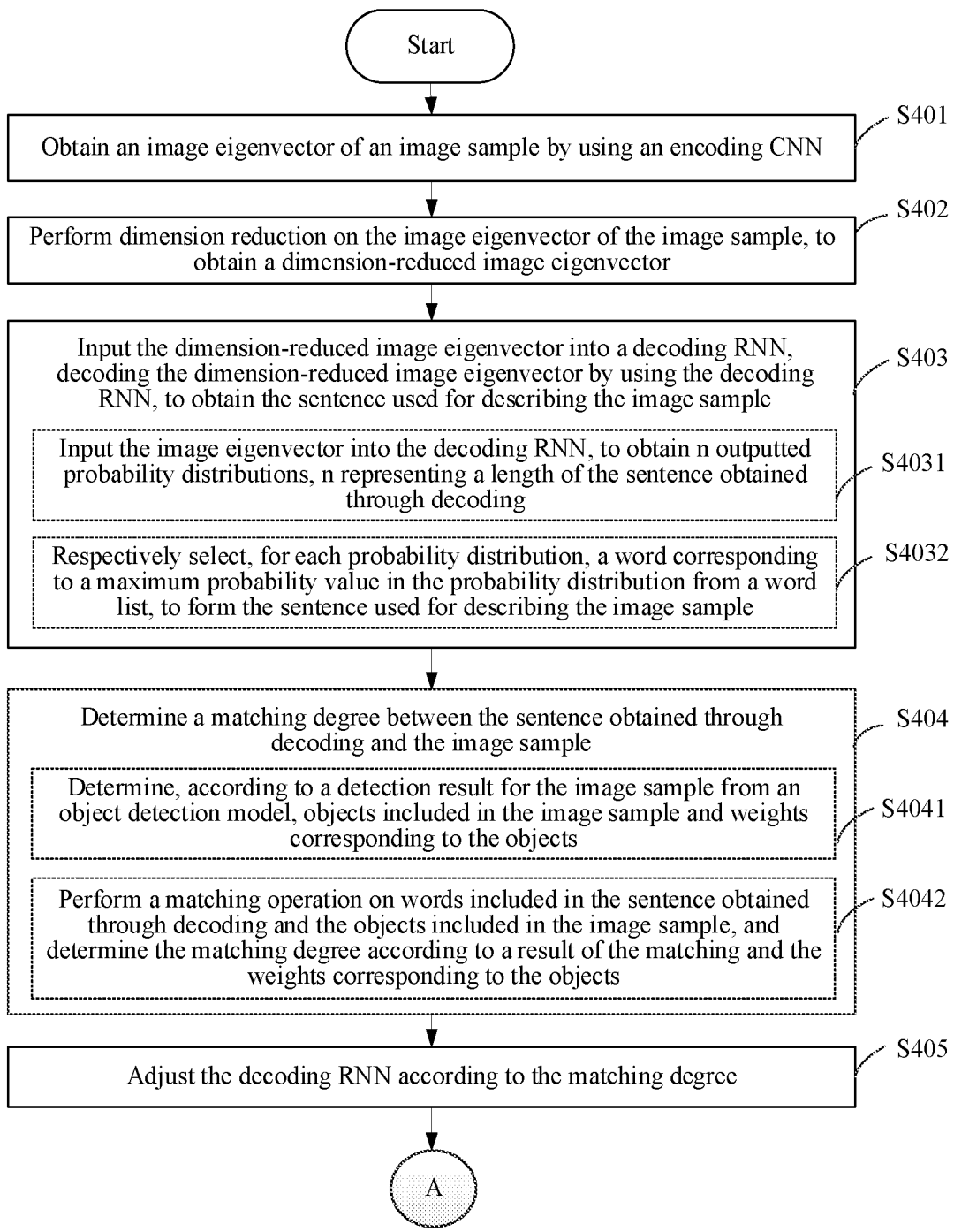
FIG. 4A and FIG. 4B are another flowchart of the method for training an image caption model according to some embodiments of this application.
Figure 4B:
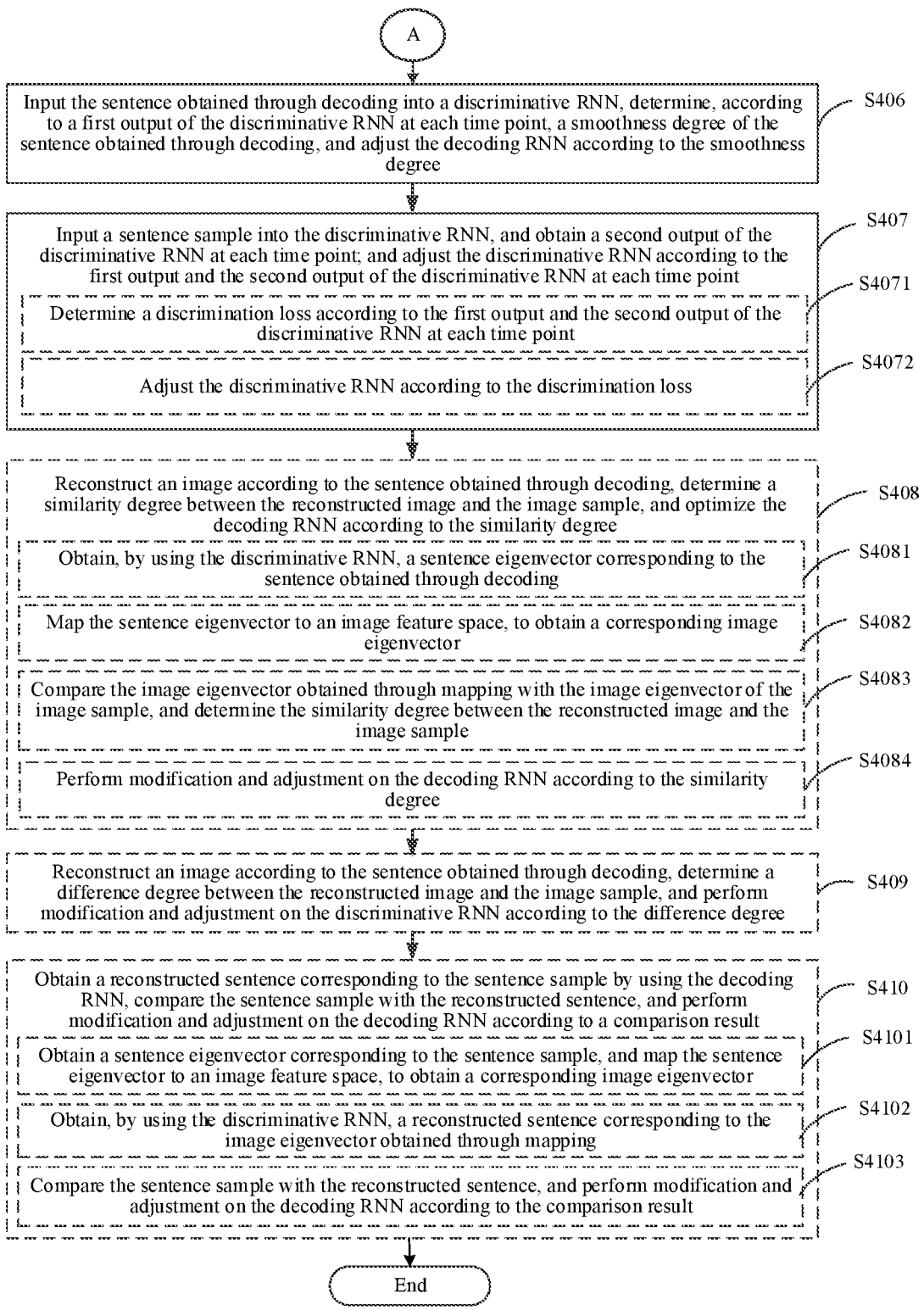

FIG. 4 is another flowchart of the method for training an image caption model according to the embodiments of this application. The method for training an image caption model provided in the embodiments of this application is described below with reference to FIG. 4. As shown in FIG. 4, the method includes the following steps:

S401: Obtain an image eigenvector (or image feature vector) of an image sample by using an encoding CNN.

In some embodiments of this application, the image eigenvector of the image sample may be obtained by using the encoding CNN 201 shown in FIG. 2.

Description is made below by using an example in which the encoding CNN is an Inception-V4 CNN.

In some embodiments, a vector outputted by a pooling layer (average pooling layer) of the Inception-V4 CNN may be selected as the image eigenvector. An operation of the encoding CNN may be expressed by the following formula (1):

$$f_{im}=CNN(I) \quad (1)$$

where I represents the image sample inputted into the encoding CNN, CNN represents the encoding CNN, $f_{im}$ is the obtained image eigenvector, and a quantity of dimensions of $f_{im}$ may be 1536.

S402: Perform dimension reduction on the image eigenvector of the image sample, to obtain a dimension-reduced image eigenvector.

In some embodiments, after the image eigenvector $f_{im}$ corresponding to the image sample is obtained, considering an amount of computation of subsequent operations, dimension reduction may be performed on the image eigenvector $f_{im}$.

For example, after the encoding CNN, the dimension reduction may be implemented by using a fully-connected layer, as expressed in the following formula (2):

$$x_{-1}=FC(f_{im}) \quad (2)$$

where $x_{-1}$ represents the dimension-reduced image eigenvector, and FC( ) represents a dimension reduction operation performed by using the fully-connected layer.

S403: Input the dimension-reduced image eigenvector into the decoding RNN, decoding the dimension-reduced image eigenvector by using the decoding RNN, to obtain the sentence used for describing the image sample.

Figure 5:
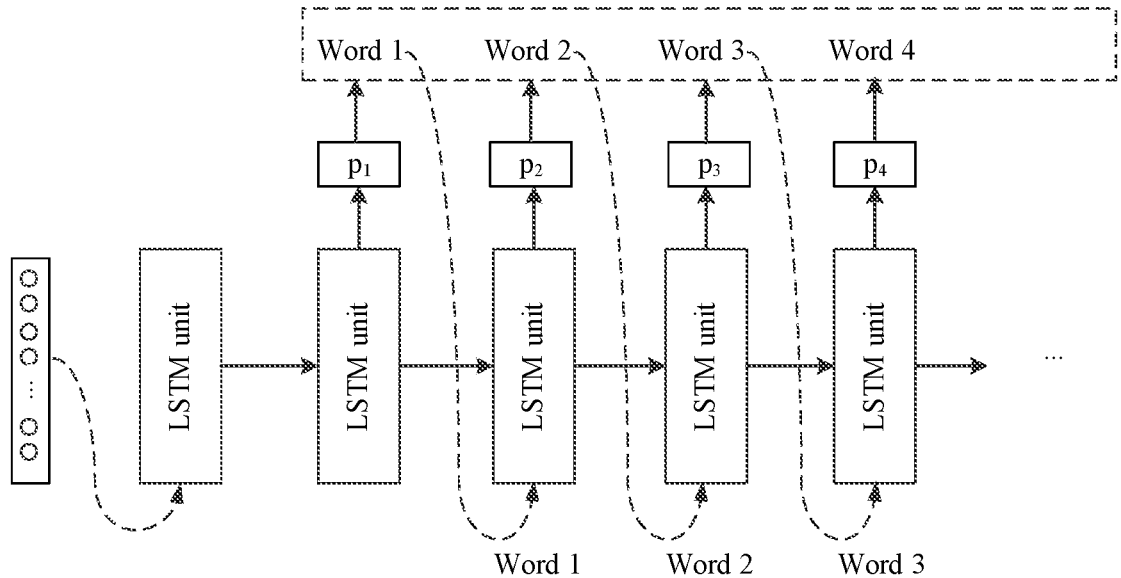
FIG. 5 is a schematic structural diagram of a decoding RNN according to some embodiments of this application.

FIG. 5 is a schematic structural diagram of a decoding RNN according to some embodiments of this application. In the embodiment shown in FIG. 5, an example in which the decoding RNN is implemented by using an LSTM unit is used. Referring to FIG. 4 and FIG. 5, step S403 includes the following steps:

S4031: Input the image eigenvector into the decoding RNN, to obtain n outputted probability distributions, n being a positive integer and representing a length of the sentence obtained through decoding.

For example, as shown in FIGS. 5, $x_t$ and $h_t^g$ are inputted into the LSTM unit at a time point t, to obtain outputs $p_{t+1}$ and $h_{t+1}^g$ of the LSTM unit.

In some embodiments, the foregoing operations of the LSTM unit may be expressed by using the following formula (3):

$$[p_{t+1},h_{t+1}^g]=LSTM^g(x_t,h_t^g), t\in\{-1,\ldots,n-1\} \quad (3)$$

where $x_t$ represents a word vector corresponding to a $t^{th}$ word; $h_t^g$ and $h_{t+1}^g$ respectively represent implicit states of the LSTM unit at the time point t and at a time point t+1; $p_{t+1}$ represents a probability distribution, that is, a probability corresponding to each word in a word list; and n represents the length of the sentence.

In addition, because in the embodiments of this application, the sentence corresponding to the image sample is unknown during training of the decoding RNN, an input of the decoding RNN at each time point needs to be obtained according to a word outputted at a previous time point. When $t=-1$, $x_t=x_{-1}$, that is, $x_t$ is the dimension-reduced image eigenvector; and when $t\in\{0,\ldots,n-1\}$, $x_t$ is a word vector corresponding to a word $S_t$ outputted by the LSTM unit at the time point t, as shown in the formula (4):

$$x_t=W_e S_t, t\in\{0,\ldots,n-1\} \quad (4)$$

where $W_e$ represents word vector (word embedding) processing.

The word vector (word embedding) is a vector used for mapping a word or phrase from a word list to a real number.

S4032: Respectively select, for each probability distribution, a word corresponding to a maximum probability value in the probability distribution from the word list, to form the sentence used for describing the image sample.

For example, according to the probability distribution $p_{t+1}$ outputted by the LSTM unit in step S4031, a word corresponding to a maximum probability value in the probability distribution $p_{t+1}$ is selected from the word list as an output at the time point t+1.

Through the foregoing operations, the decoding RNN can obtain a sentence of the length of n: $S_1 S_2 \ldots S_n$.

S404: Determine a matching degree between the sentence obtained through decoding and the image sample.

In some embodiments, the sentence includes a plurality of words, and each time the decoding RNN decodes a word, a matching degree between the word and the image sample may be determined. That is, whether the image sample includes an object corresponding to the word may be determined.

In some embodiments, step S404 may include the following operations:

S4041: Determine, according to a detection result for the image sample from an object detection model, objects included in the image sample and weights corresponding to the objects.

In some embodiments, the image sample may be pre-detected by using an object detection model, to obtain an object included in the image sample and a score (weight) corresponding to the object.

S4042: Perform a matching operation on words included in the sentence obtained through decoding and the objects included in the image sample, and determine the matching degree according to a result of the matching and the weights corresponding to the objects.

In some embodiments, the matching operation may be performed according to the following formula (5), and a matching degree between a word obtained by the decoding RNN and the image sample is determined:

$$r_t^c = \sum_{i=1}^{N_c} I(s_t = c_i) * v_i \qquad (5)$$

where $s_t$ represents the word obtained by the decoding RNN through decoding, $c_i$ represents an object detected from the image sample by the object detection model, $v_i$ is a weight corresponding to the object, and $N_c$ represents a quantity of objects detected from the image sample by the object detection model; $r_t^c$ represents the matching degree between the word $s_t$ and the image sample; and $I(\ )$ represents an indicator function.

After the matching degree $r_t^c$ is obtained, the matching degree may be used as an object recognition award, to be fed back to the decoding RNN, thereby implementing optimization on the decoding RNN.

S405: Adjust the decoding RNN according to the matching degree.

In some embodiments, the matching degree may be fed back to the decoding RNN, so as to modify a weight parameter and the word vector $W_e$ in the decoding RNN.

In this way, through continuous training, the weight parameter and the word vector $W_e$ in the decoding RNN may be continuously modified, thereby improving precision of the decoding RNN.

For a decoding RNN implemented by using an LSTM unit, the LSTM unit has three gates: a forget gate, an input gate, and an output gate. The forget gate determines how many unit states at a previous time point are retained to a current time point. The input gate determines how many network outputs at the current time point are reserved to the current time point. The output gate determines how many current unit states are outputted to current output values of an LSTM.

A gate is actually a fully-connected layer; an input is a vector; and an output is a real number vector between 0 and 1. When an output of a gate is 0, a 0 vector is obtained when any vector is multiplied by the output, which is equivalent to that nothing can pass; and when an output is 1, there is no change when any vector is multiplied by the output, which is equivalent to that anything can pass.

Therefore, the matching degree calculated in step S404 may be fed back to the decoding RNN, and used for adjusting weight matrices of the gates, so as to perform modification and adjustment on the decoding RNN.

In addition, in each training process, the word vector $W_e$ also updates parameters according to the matching degree to change.

S406: Input the sentence obtained through decoding into a discriminative RNN, determine, according to a first output of the discriminative RNN at each time point, a smoothness degree of the sentence obtained through decoding, and adjust the decoding RNN according to the smoothness degree.

In some embodiments, the sentence obtained through decoding may be inputted into a discriminative RNN, and the smoothness degree of the sentence obtained through decoding is determined according to the first output of the discriminative RNN at each time point.

For example, the sentence obtained through decoding is inputted into the discriminative RNN, and the smoothness degree of the sentence obtained through decoding is determined according to the first output of the discriminative RNN at each time point.

Figure 6:
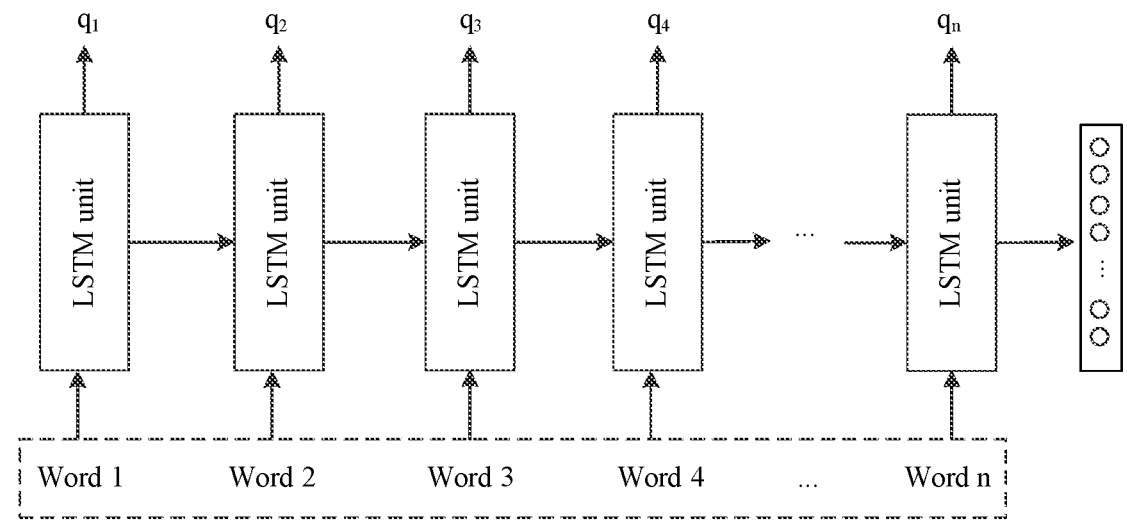
FIG. 6 is a schematic structural diagram of a discriminative RNN according to some embodiments of this application.

FIG. 6 is a schematic diagram of a discriminative RNN according to some embodiments of this application. In the embodiment shown in FIG. 6, description is made still by using an example in which the discriminative RNN is implemented by using an LSTM unit. The discriminative RNN may alternatively be implemented in other manners, for example, implemented by using a GRU unit.

Referring to FIG. 6, an operation of the LSTM unit in the discriminative RNN may be shown in the following formula (6):

$$[q_t, h_t^d] = \text{LSTM}^d(x_t, h_{t-1}^d), t \in \{1, \ldots, n\} \qquad (6)$$

where inputs of the LSTM unit at the time point t include: $x_t$ and $h_{t-1}^d$, and outputs include: $q_t$ and $h_t^d$; herein, $x_t$ represents the word vector corresponding to the $t^{th}$ word, and $h_{t-1}^d$ represents an implicit state of the LSTM unit at a time point t−1; and $q_t$ represents a score for the smoothness degree of the sentence at the time point t, and $h_t^d$ represents an implicit state of the LSTM unit at the time point t.

In some embodiments, $q_t$ may be a value between 0 and 1. When a manually written smooth sentence is inputted, the discriminative RNN outputs 1; and when a sentence generated by the decoding RNN is inputted, the discriminative RNN outputs a value between 0 and 1. An objective of the decoding RNN is to cheat the discriminative RNN, and generate a sentence that can enable the discriminative RNN to generate 1 as much as possible, so that a sentence that looks smooth can be generated.

In some embodiments, the smoothness degree of the sentence obtained through decoding may be determined according to the following formula (7):

$$r_{adv} = \sum_{t=1}^{n} \log(q_t) \qquad (7)$$

where $r_{adv}$ represents the smoothness degree, $q_t$ represents a value outputted by the discriminative RNN at the time point t, and n is a positive integer and represents a length of the sentence obtained through decoding.

In some embodiments, after the smoothness degree is obtained, the smoothness degree may be fed back to the decoding RNN, so as to adjust parameters and the word vector $W_e$ in the decoding RNN, thereby improving precision of the decoding RNN.

Herein, similar to step S405, the smoothness degree may be used for adjusting the weight matrices of the gates in the decoding RNN and the word vector $W_e$, so as to perform modification and adjustment on the decoding RNN.

S407: Input a sentence sample into the discriminative RNN, and obtain a second output of the discriminative RNN at each time point; and adjust the discriminative RNN according to the first output and the second output of the discriminative RNN at each time point.

In some embodiments, step S407 may include the following operations:

S4071: Determine a discrimination loss according to the first output and the second output of the discriminative RNN at each time point.

For example, the discrimination loss may be calculated according to the following formula (8):

$$L_{adv} = -\left[\frac{1}{l}\sum_{t=1}^{l}\log(\hat{q}_t) + \frac{1}{n}\sum_{t=1}^{n}\log(1-q_t)\right] \quad (8)$$

where $L_{adv}$ represents the discrimination loss, $q_t$ represents a first output of the discriminative RNN at the time point t, and $\hat{q}_t$ represents a second output of the discriminative RNN at the time point t; l is a positive integer and represents a length of the sentence sample; and n is a positive integer and represents the length of the sentence obtained through decoding.

S4072: Adjust the discriminative RNN according to the discrimination loss.

Herein, the discrimination loss is used for adjusting parameters of the discriminative RNN.

For example, for a case that the discriminative RNN is implemented by using the LSTM unit, the discrimination loss may be fed back to the discriminative RNN, so as to adjust weight matrices of gates of the LSTM unit in the discriminative RNN, thereby performing adjustment and modification on the discriminative RNN.

Through step S404 to step S407, on one hand, the parameters of the decoding RNN are modified for the smoothness degree of the sentence obtained through decoding and the matching degree of the image sample; on the other hand, the discriminative RNN used for supervising learning of the decoding RNN is also modified and adjusted.

To further improve precision of the decoding RNN and the discriminative RNN, in some embodiments, the method may further include any one or more of the following steps S408 to S410:

S408: Reconstruct an image according to the sentence obtained through decoding, determine a similarity degree between the reconstructed image and the image sample, and optimize the decoding RNN according to the similarity degree.

In some embodiments, step S408 includes the following operations:

S4081: Obtain, by using the discriminative RNN, a sentence eigenvector corresponding to the sentence obtained through decoding.

S4082: Map the sentence eigenvector to an image feature space, to obtain a corresponding image eigenvector.

In some embodiments, a fully-connected layer may be added to the last portion of the discriminative RNN. The fully-connected layer may map the sentence eigenvector to the image feature space, to obtain the image eigenvector corresponding to the reconstructed image.

S4083: Compare the image eigenvector obtained through mapping with the image eigenvector of the image sample, and determine the similarity degree between the reconstructed image and the image sample.

In some embodiments, the similarity degree between the reconstructed image and the image sample may be calculated according to the following formula (9):

$$r_{im} = -\|x_{-1} - x'\|_2^2 \quad (9)$$

where $r_{im}$ represents the similarity degree between the reconstructed image and the image sample; x_1 represents a global feature representation of the image sample; x' represents a global feature representation of the reconstructed image; and $\|\ \|_2^2$ represents a norm taking operation.

S4084: Perform modification and adjustment on the decoding RNN according to the similarity degree.

Herein, the modification and adjustment on the decoding RNN is similar to that of step S405. The calculated similarity degree $r_{im}$ may be fed back to the decoding RNN, so as to adjust the weight matrices of the gates of the decoding RNN and the word vector, to improve precision of the decoding RNN.

S409: Reconstruct an image according to the sentence obtained through decoding, determine a difference degree between the reconstructed image and the image sample, and perform modification and adjustment on the discriminative RNN according to the difference degree.

In some embodiments, the difference degree between the reconstructed image and the image sample may be determined according to the following formula (10):

$$L_{im} = \|x_{-1} - x'\|_2^2 \quad (10)$$

where $L_{im}$ represents the difference degree between the reconstructed image and the image sample; $x_{-1}$ represents the global feature representation of the image sample, x' represents a global feature representation of the reconstructed image; and $\|\ \|_2^2$ represents a norm taking operation.

Herein, after the difference degree is calculated, the difference degree may be fed back to the discriminative RNN, so as to adjust the weight matrices of the gates in the discriminative RNN, thereby improving precision of the discriminative RNN.

S410: Obtain a reconstructed sentence corresponding to the sentence sample by using the decoding RNN, compare the sentence sample with the reconstructed sentence, and perform modification and adjustment on the decoding RNN according to a comparison result.

In some embodiments, step S410 includes the following operations:

S4101: Obtain a sentence eigenvector corresponding to the sentence sample, and map the sentence eigenvector to an image feature space, to obtain a corresponding image eigenvector;

S4102: Obtain, by using the discriminative RNN, a reconstructed sentence corresponding to the image eigenvector obtained through mapping.

S4103: Compare the sentence sample with the reconstructed sentence, and perform modification and adjustment on the decoding RNN according to the comparison result.

In some embodiments, the comparison between the sentence sample and the reconstructed sentence may be implemented by using the following formula (11):

$$L_{sen} = -\sum_{t=1}^{t} \log(p(\hat{s}_t = s_t | s_1, \ldots, s_{t-1})) \quad (11)$$

where $L_{sen}$ represents a sentence reconstruction loss, $s_t$ represents a $t^{th}$ word in the sentence obtained through decoding, $\hat{s}_t$ represents a $t^{th}$ word in the sentence sample, and $p(\hat{s}_t=s_t|s_1, \ldots, s_{t-1})$ represents a conditional probability.

After the reconstruction loss $L_{sen}$ is obtained, the reconstruction loss may be fed back to the decoding RNN, to adjust the weight matrices of the gates in the decoding RNN and the word vector.

In this step, the operation of sentence reconstruction is similar to that of an automatic denoising encoder. To make an obtained image caption model more robust, two types of noise may be added to an inputted sentence, which includes randomly removing some words and randomly disrupting a sequence of some words. A loss of the automatic denoising encoder may be shown in the foregoing formula (11).

By using the technical solutions provided in the embodiments of this application, a decoding RNN is trained and adjusted according to a smoothness degree of a sentence obtained by the decoding RNN through decoding and a matching degree between the sentence obtained through decoding and an image sample. In this way, in a training process of an image caption model, pairs of image samples and sentence samples are not required to be used as a training set, so that dependence on pairs of image samples and sentence samples is eliminated, thereby expanding a range of the training set, and improving accuracy of the image caption model.

Further, the decoding RNN and a discriminative RNN are further modified and adjusted through operations of image reconstruction and sentence reconstruction, thereby further improving the accuracy of the image caption model.

After the training of the image caption model is completed, a sentence caption for an inputted image is obtained by using a trained image caption model and a beam search method.

Beam search is a heuristic image search algorithm, which is usually used in a case that solution space of an image is relatively large. To reduce space and time occupied by search, during each step of deep extension, some nodes having relatively poor quality are cut off, and some nodes having relatively good quality are retained.

The method for training an image caption model provided in the embodiments of this application is described above.

The apparatus for training an image caption model provided in the embodiments of this application is described below with reference to the accompanying drawings.

Figure 7:
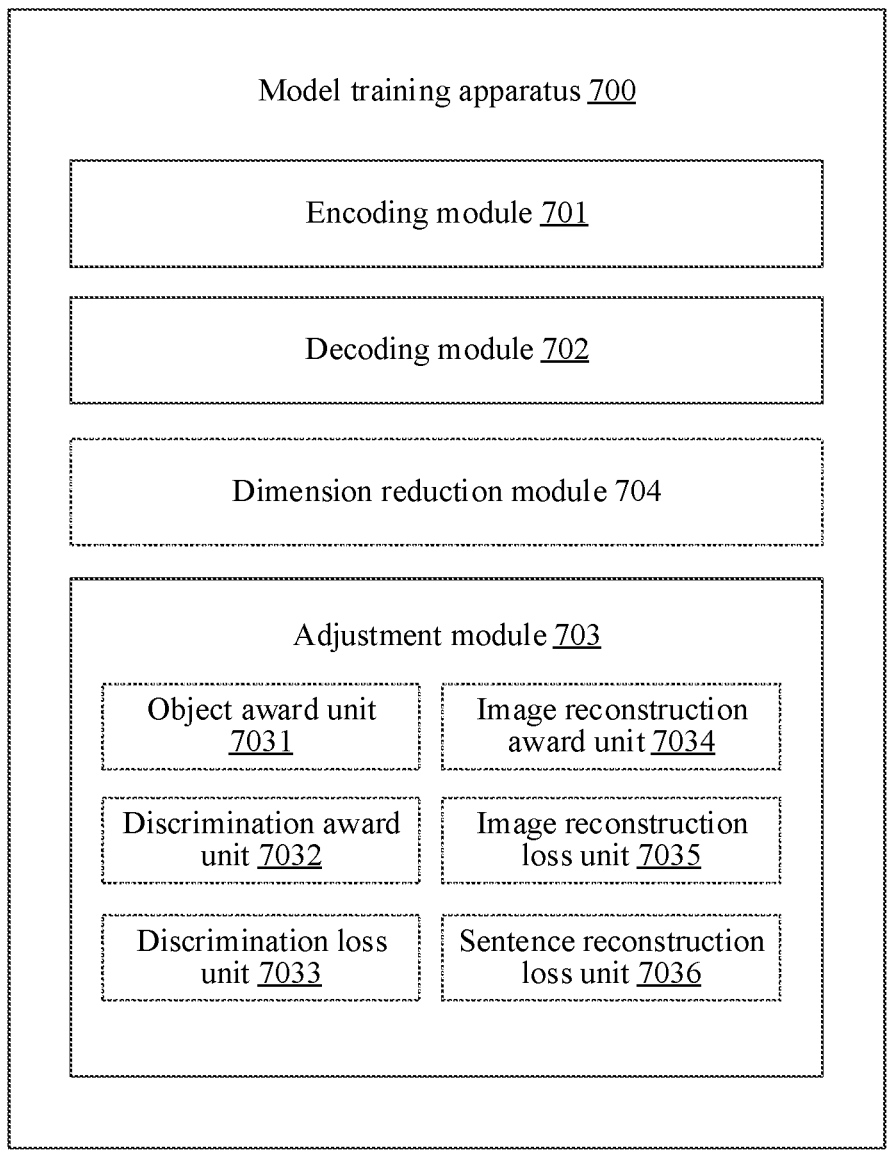
FIG. 7 is a schematic structural diagram of an apparatus for training an image caption model according to some embodiments of this application.

FIG. 7 is a schematic structural diagram of an apparatus for training an image caption model according to some embodiments of this application. As shown in FIG. 7, the apparatus 700 includes:
an encoding module 701, configured to obtain an image eigenvector of an image sample by using an encoding CNN;
a decoding module 702, configured to decode the image eigenvector by using a decoding RNN, to obtain a sentence used for describing the image sample; and
an adjustment module 703, configured to: determine a matching degree between the sentence obtained through decoding and the image sample, and adjust the decoding RNN according to the matching degree; and determine a smoothness degree of the sentence obtained through decoding, and adjust the decoding RNN according to the smoothness degree.

In some embodiments, the apparatus 700 further includes:
a dimension reduction module 704, configured to: after the encoding module 701 obtains the image eigenvector of the image sample, perform dimension reduction on the image eigenvector, to obtain a dimension-reduced image eigenvector.

The decoding module 702 is further configured to: input the dimension-reduced image eigenvector into the decoding RNN, the decoding RNN decoding the dimension-reduced image eigenvector, to obtain the sentence used for describing the image sample.

In some embodiments, the sentence includes a plurality of words, and the decoding module 702 is further configured to:
input the image eigenvector into the decoding RNN, to obtain n outputted probability distributions, n being a positive integer and representing a length of the sentence obtained through decoding; and
respectively select, for each probability distribution, a word corresponding to a maximum probability value in the probability distribution from a word list, to form the sentence used for describing the image sample.

In some embodiments, the adjustment module 703 further includes: an object award unit 7031, configured to:
determine, according to a detection result for the image sample from an object detection model, objects included in the image sample and weights corresponding to the objects; and
perform a matching operation on words included in the sentence obtained through decoding and the objects included in the image sample, determine the matching degree between the sentence obtained through decoding and the image sample according to a result of the matching and the weights corresponding to the objects, and adjust the decoding RNN according to the matching degree.

In some embodiments, the adjustment module 703 further includes: a discrimination award unit 7032, configured to:
input the sentence obtained through decoding into a discriminative RNN, determine, according to a first output of the discriminative RNN at each time point, a smoothness degree of the sentence obtained through decoding, and adjust the decoding RNN according to the smoothness degree.

In some embodiments, the discrimination award unit 7032 is further configured to: determine the smoothness degree according to the following formula:

$$r_{adv} = \sum_{t=1}^{n} \log(q_t)$$

where $r_{adv}$ represents the smoothness degree, $q_t$ represents a first output of the discriminative RNN at a time point t, and n is a positive integer and represents a length of the sentence obtained through decoding.

In some embodiments, the adjustment module 703 further includes: a discrimination loss unit 7033, configured to:
input a sentence sample into the discriminative RNN, and obtain a second output of the discriminative RNN at each time point; and
adjust the discriminative RNN according to the first output and the second output of the discriminative RNN at each time point.

In some embodiments, the discrimination loss unit 7033 is further configured to:
    determine a discrimination loss according to the first output and the second output of the discriminative RNN at each time point according to the following formula; and $$L_{adv} = -\left[\frac{1}{l}\sum_{t=1}^{l}(\hat{q}_t) + \frac{1}{n}\sum_{t=1}^{n}(1-q_t)\right]$$

adjust the discriminative RNN according to the discrimination loss,
where $q_t$ represents a first output of the discriminative RNN at the time point t, and $\hat{q}_t$ represents a second output of the discriminative RNN at the time point t; l is a positive integer and represents a length of the sentence sample; $L_{adv}$ represents the discrimination loss; and n is a positive integer and represents a length of the sentence obtained through decoding.

In some embodiments, the adjustment module 703 further includes: an image reconstruction award unit 7034, configured to:
    reconstruct an image according to the sentence obtained through decoding;
    determine a similarity degree between the reconstructed image and the image sample; and
    adjust the decoding RNN according to the similarity degree.

In some embodiments, the image reconstruction award unit 7034 is further configured to:
    obtain a sentence eigenvector corresponding to the sentence obtained through decoding; and
    map the sentence eigenvector to an image feature space, to obtain a corresponding image eigenvector; and
    compare the image eigenvector obtained through mapping with the image eigenvector of the image sample, and determine the similarity degree between the reconstructed image and the image sample.

In some embodiments, the similarity degree $r_{im}$ between the reconstructed image and the image sample may be calculated according to the foregoing formula (9). Then, the calculated similarity degree $r_{im}$ may be fed back to the decoding RNN, so as to adjust weight matrices of gates of the decoding RNN and a word vector, to improve precision of the decoding RNN.

In some embodiments, the adjustment module 703 further includes: an image reconstruction loss unit 7035, configured to:
    reconstruct an image according to the sentence obtained through decoding;
    determine a difference degree between the reconstructed image and the image sample; and
    adjust the discriminative RNN according to the difference degree.

In some embodiments, the difference degree $L_{im}$ may be calculated by using the foregoing formula (10). After the difference degree $L_{im}$ is calculated, the difference degree may be fed back to the discriminative RNN, so as to adjust weight matrices of gates in the discriminative RNN, thereby improving precision of the discriminative RNN.

In some embodiments, the adjustment module 703 further includes: a sentence reconstruction loss unit 7036, configured to:
    obtain a reconstructed sentence corresponding to the sentence sample by using the decoding RNN, compare the sentence sample with the reconstructed sentence, and perform modification and adjustment on the decoding RNN according to a comparison result.

In some embodiments, the sentence reconstruction loss unit 7036 may obtain a sentence eigenvector corresponding to the sentence sample, and map the sentence eigenvector to an image feature space, to obtain a corresponding image eigenvector; obtain a reconstructed sentence corresponding to the image eigenvector obtained through mapping; and compare the sentence sample with the reconstructed sentence, and adjust the decoding RNN according to a comparison result.

In some embodiments, the sentence reconstruction loss unit 7036 may obtain a sentence reconstruction loss $L_{sen}$ according to the foregoing formula (11). After the reconstruction loss $L_{sen}$ is obtained, the reconstruction loss may be fed back to the decoding RNN, to adjust the weight matrices of the gates in the decoding RNN and the word vector.

By using the technical solutions provided in the embodiments of this application, a decoding RNN is trained and adjusted according to a smoothness degree of a sentence obtained by the decoding RNN through decoding and a matching degree between the sentence obtained through decoding and an image sample. In this way, in a training process of an image caption model, pairs of image samples and sentence samples are not required to be used as a training set, so that dependence on pairs of image samples and sentence samples is eliminated, thereby expanding a range of the training set, and improving accuracy of the image caption model.

Further, the decoding RNN and a discriminative RNN are further modified and adjusted through operations of image reconstruction and sentence reconstruction, thereby further improving the accuracy of the image caption model.

After the training of the image caption model is completed, a sentence caption for an inputted image is obtained by using a trained image caption model and a beam search method.

Figure 8:
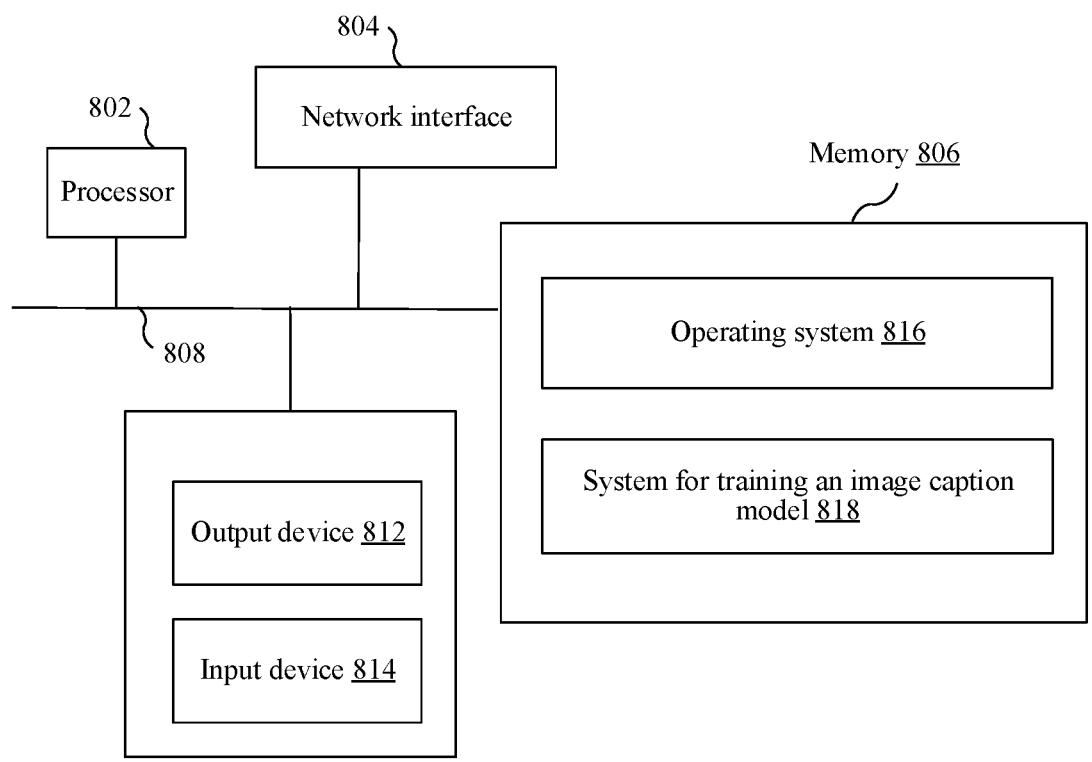
FIG. 8 is another schematic structural diagram of the apparatus for training an image caption model according to some embodiments of this application.

FIG. 8 is another schematic structural diagram of the apparatus for training an image caption model according to some embodiments of this application. The apparatus 800 for training an image caption model may be the model training apparatus 116 shown in FIG. 1, or may be a component integrated in the model training apparatus 116.

As shown in FIG. 8, the apparatus 800 for training an image caption model includes one or more processors (CPU) 802, a network interface 804, a memory 806, and a communication bus 808 configured to interconnect the components.

In some embodiments, the network interface 804 is configured to implement a network connection between the apparatus 800 for training an image caption model and an external device.

The apparatus 800 for training an image caption model may further include one or more output devices 812 (for example, one or more visual displays), and/or one or more input devices 814 (for example, a keyboard, a mouse, or another input control).

The memory 806 may be a high-speed random access memory such as a dynamic random access memory (DRAM), a static random access memory (SRAM), a double data rate random access memory (DDR RAM), or another random access solid-state storage device; or a non-volatile memory such as one or more magnetic storage devices, an optical disc storage device, a flash memory, or another non-volatile solid-state storage device.

The memory 806 includes:
an operating system 816 including programs for handling various basic system services and for performing hardware-related tasks; and
a system 818 for training an image caption model, configured to: obtain an image eigenvector of an image sample by using an encoding CNN; decode the image eigenvector by using a decoding RNN, to obtain a sentence used for describing the image sample; determine a matching degree between the sentence obtained through decoding and the image sample, and adjust the decoding RNN according to the matching degree; and determine a smoothness degree of the sentence obtained through decoding, and adjust the decoding RNN according to the smoothness degree.

In some embodiments, for specific operations and functions of the system 818 for training an image caption model, reference may be made to the foregoing method embodiments. Details are not described herein again.

In this application, the term "module" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. In addition, functional modules in the embodiments of this application may be integrated into one processing unit, or each of the modules may exist alone physically, or two or more modules may be integrated into one unit. The integrated unit may be implemented in a form of hardware, or may be implemented in a form of a software functional unit. The function modules in the embodiments may be located on one terminal or network node, or may be distributed on a plurality of terminals or network nodes.

In addition, each embodiment of this application may be implemented by a data processing program that is executed by a data processing device such as a computer. Apparently, the data processing program constitutes this application. In addition, generally the data processing program stored in a storage medium is executed by directly reading the program from the storage medium or by installing or copying the program to a storage device (such as a hard disk or internal memory) of the data processing device. Therefore, such a storage medium also constitutes this application. The storage medium may use any type of recording manner, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, this application further provides a storage medium, which stores a data processing program. The data processing program is used for performing any embodiment of the foregoing method of this application.

A person of ordinary skill in the art may understand that, all or some of the steps of the methods in the foregoing embodiments may be implemented by a program instructing relevant hardware. The program may be stored in a computer-readable storage medium. The storage medium may include: a read only memory (ROM), a random access memory (RAM), a magnetic disk, an optical disc, or the like.

The foregoing descriptions are merely exemplary embodiments of this application and are not intended to limit the protection scope of this application. Any modification, equivalent replacement, or improvement made without departing from the spirit and principle of this application shall fall within the protection scope of this application.

What is claimed is:

1. A method for training an image caption model, performed by an electronic device, the image caption model comprising an encoding convolutional neural network (CNN) and a decoding recurrent neural network (RNN) and a discriminative RNN, and the method comprising:
obtaining an image eigenvector of an image sample by using the encoding CNN;
decoding the image eigenvector by using the decoding RNN, to obtain a sentence used for describing the image sample;
determining a matching degree between the sentence obtained through decoding and the image sample, further including:
identifying objects in the image sample from an object detection model;
comparing the identified objects with object-representing words in the sentence obtained through decoding; and
determining the matching degree based on the comparison result and weights corresponding to the objects;
determining a smoothness degree of the sentence obtained through decoding further including:
inputting the sentence obtained through decoding into the discriminative RNN, and obtaining a first output of the discriminative RNN at each time point corresponding to the sentence obtained through decoding; and
determining the smoothness degree of the sentence obtained through decoding according to the first output of the discriminative RNN at each time point;
adjusting weighting parameters of the decoding RNN to improve the matching degree and the smoothness degree; and
adjusting the discriminative RNN according to the first output of the discriminative RNN at each time point, further including:
inputting a smooth sentence sample into the discriminative RNN, and obtaining a second output of the discriminative RNN at each time point corresponding to the smooth sentence sample, wherein the smooth sentence sample is irrelevant to the sentence obtained through decoding;
determining a discrimination loss of the discriminative RNN according to the first output and the second output of the discriminative RNN at each time point;
adjusting weighting parameters of the discriminative RNN to reduce the discrimination loss of the discriminative RNN.

2. The method according to claim 1, wherein after the obtaining an image eigenvector of an image sample, the method further comprises:
performing dimension reduction on the image eigenvector, to obtain a dimension-reduced image eigenvector; and
the decoding the image eigenvector by using the decoding RNN, to obtain a sentence used for describing the image sample comprises:
inputting the dimension-reduced image eigenvector into the decoding RNN, and decoding the dimension-reduced image eigenvector by using the decoding RNN, to obtain the sentence used for describing the image sample.

3. The method according to claim 1, wherein the decoding the image eigenvector by using the decoding RNN, to obtain a sentence used for describing the image sample comprises:
inputting the image eigenvector into the decoding RNN, to obtain n outputted probability distributions, n being a positive integer and representing a length of the sentence obtained through decoding; and
respectively selecting, for each of the n probability distributions, a word corresponding to a maximum probability value in the probability distribution from a word list, to form the sentence used for describing the image sample.

4. The method according to claim 1, wherein the determining the smoothness degree of the sentence obtained through decoding according to the first output of the discriminative RNN at each time point comprises:
determining the smoothness degree according to the following formula:

$$r_{adv} = \sum_{t=1}^{n} \log(q_t)$$

$r_{adv}$ representing the smoothness degree, $q_t$ representing a first output of the discriminative RNN at a time point t, and n being a positive integer and representing a length of the sentence obtained through decoding.

5. The method according to claim 1, wherein the determining a discrimination loss of the discriminative RNN according to the first output and the second output of the discriminative RNN at each time point comprises:
determining the discrimination loss according to the first output and the second output of the discriminative RNN at each time point according to the following formula;

$$L_{adv} = -\left[\frac{1}{l}\sum_{t=1}^{l} \log(\hat{q}_t) + \frac{1}{n}\sum_{t=1}^{n} \log(1 - q_t)\right]$$

$q_t$ representing a first output of the discriminative RNN at a time point t, $\hat{q}_t$ representing a second output of the discriminative RNN at the time point t, l being a positive integer and representing a length of the sentence sample, $L_{adv}$ representing the discrimination loss, and n being a positive integer and representing a length of the sentence obtained through decoding.

6. The method according to claim 1, further comprising:
reconstructing an image according to the sentence obtained through decoding;
determining a difference degree between the reconstructed image and the image sample; and
adjusting the discriminative RNN according to the difference degree.

7. The method according to claim 1, further comprising:
reconstructing an image according to the sentence obtained through decoding;
determining a similarity degree between the reconstructed image and the image sample; and
adjusting the decoding RNN according to the similarity degree.

8. The method according to claim 7, wherein the reconstructing an image according to the sentence obtained through decoding comprises:

obtaining a sentence eigenvector corresponding to the sentence obtained through decoding;
mapping the sentence eigenvector to an image feature space, to obtain a corresponding image eigenvector; and
the determining a similarity degree between the reconstructed image and the image sample comprises:
comparing the image eigenvector obtained through mapping with the image eigenvector of the image sample, and determining the similarity degree between the reconstructed image and the image sample in accordance with the comparison result.

9. The method according to claim 1, further comprising:
obtaining a sentence eigenvector corresponding to a sentence sample, and mapping the sentence eigenvector to an image feature space, to obtain a corresponding image eigenvector;
obtaining a reconstructed sentence corresponding to the image eigenvector obtained through mapping; and
comparing the sentence sample with the reconstructed sentence, and adjusting the decoding RNN according to the comparison result.

10. An electronic device for training an image caption model comprising an encoding convolutional neural network (CNN) and a decoding recurrent neural network (RNN) and a discriminative RNN, the electronic device comprising:
one or more processors; and
a memory connected to the one or more processors, the memory storing a plurality of computer programs, the plurality of computer programs, when executed by the one or more processors, cause the electronic device to perform a plurality of operations including:
obtaining an image eigenvector of an image sample by using the encoding CNN;
decoding the image eigenvector by using the decoding RNN, to obtain a sentence used for describing the image sample;
determining a matching degree between the sentence obtained through decoding and the image sample, further including:
identifying objects in the image sample from an object detection model;
comparing the identified objects with object-representing words in the sentence obtained through decoding; and
determining the matching degree based on the comparison result and weights corresponding to the objects;
determining a smoothness degree of the sentence obtained through decoding further including:
inputting the sentence obtained through decoding into the discriminative RNN, and obtaining a first output of the discriminative RNN at each time point corresponding to the sentence obtained through decoding; and
determining the smoothness degree of the sentence obtained through decoding according to the first output of the discriminative RNN at each time point;
adjusting weighting parameters of the decoding RNN to improve the matching degree and the smoothness degree; and
adjusting the discriminative RNN according to the first output of the discriminative RNN at each time point, further including:
inputting a smooth sentence sample into the discriminative RNN, and obtaining a second output of the discriminative RNN at each time point corresponding to the smooth sentence sample, wherein the smooth sentence sample is irrelevant to the sentence obtained through decoding;

determining a discrimination loss of the discriminative RNN according to the first output and the second output of the discriminative RNN at each time point;

adjusting weighting parameters of the discriminative RNN to reduce the discrimination loss of the discriminative RNN.

11. The electronic device according to claim 10, wherein the plurality of operations further comprises:

after obtaining the image eigenvector of the image sample:

performing dimension reduction on the image eigenvector, to obtain a dimension-reduced image eigenvector; and the decoding the image eigenvector by using the decoding RNN, to obtain a sentence used for describing the image sample comprises:

inputting the dimension-reduced image eigenvector into the decoding RNN, and decoding the dimension-reduced image eigenvector by using the decoding RNN, to obtain the sentence used for describing the image sample.

12. The electronic device according to claim 10, wherein the decoding the image eigenvector by using the decoding RNN, to obtain a sentence used for describing the image sample comprises:

inputting the image eigenvector into the decoding RNN, to obtain n outputted probability distributions, n being a positive integer and representing a length of the sentence obtained through decoding; and respectively selecting, for each of the n probability distributions, a word corresponding to a maximum probability value in the probability distribution from a word list, to form the sentence used for describing the image sample.

13. The electronic device according to claim 10, wherein the plurality of operations further comprises:

reconstructing an image according to the sentence obtained through decoding;

determining a similarity degree between the reconstructed image and the image sample; and adjusting the decoding RNN according to the similarity degree.

14. The electronic device according to claim 10, wherein the plurality of operations further comprises:

obtaining a sentence eigenvector corresponding to a sentence sample, and mapping the sentence eigenvector to an image feature space, to obtain a corresponding image eigenvector;

obtaining a reconstructed sentence corresponding to the image eigenvector obtained through mapping; and comparing the sentence sample with the reconstructed sentence, and adjusting the decoding RNN according to the comparison result.

15. A non-transitory computer-readable storage medium, storing a plurality of computer programs for training an image caption model comprising an encoding convolutional neural network (CNN) and a decoding recurrent neural network (RNN), the plurality of computer programs, when executed by one or more processors of an electronic device, cause the electronic device to perform a plurality of operations including:

obtaining an image eigenvector of an image sample by using the encoding CNN;

decoding the image eigenvector by using the decoding RNN, to obtain a sentence used for describing the image sample;

determining a matching degree between the sentence obtained through decoding and the image sample, further including:

identifying objects in the image sample from an object detection model;

comparing the identified objects with object-representing words in the sentence obtained through decoding; and determining the matching degree based on the comparison result and weights corresponding to the objects;

determining a smoothness degree of the sentence obtained through decoding further including:

inputting the sentence obtained through decoding into the discriminative RNN, and obtaining a first output of the discriminative RNN at each time point corresponding to the sentence obtained through decoding; and determining the smoothness degree of the sentence obtained through decoding according to the first output of the discriminative RNN at each time point;

adjusting weighting parameters of the decoding RNN to improve the matching degree and the smoothness degree; and adjusting the discriminative RNN according to the first output of the discriminative RNN at each time point, further including:

inputting a smooth sentence sample into the discriminative RNN, and obtaining a second output of the discriminative RNN at each time point corresponding to the smooth sentence sample, wherein the smooth sentence sample is irrelevant to the sentence obtained through decoding;

determining a discrimination loss of the discriminative RNN according to the first output and the second output of the discriminative RNN at each time point;

adjusting weighting parameters of the discriminative RNN to reduce the discrimination loss of the discriminative RNN.

16. The electronic device according to claim 10, wherein the determining the smoothness degree of the sentence obtained through decoding according to the first output of the discriminative RNN at each time point comprises:

determining the smoothness degree according to the following formula:

$$r_{adv} = \sum_{t=1}^{n} \log(q_t)$$

$r_{adv}$ representing the smoothness degree, $q_t$ representing a first output of the discriminative RNN at a time point t, and n being a positive integer and representing a length of the sentence obtained through decoding.

17. The electronic device according to claim 10, wherein the determining a discrimination loss of the discriminative RNN according to the first output and the second output of the discriminative RNN at each time point comprises:

determining the discrimination loss according to the first output and the second output of the discriminative RNN at each time point according to the following formula; and $$L_{adv} = -\left[\frac{1}{l}\sum_{t=1}^{l}\log(\hat{q}_t) + \frac{1}{n}\sum_{t=1}^{n}\log(1-q_t)\right]$$

$q_t$ representing a first output of the discriminative RNN at a time point t, $\hat{q}_t$ representing a second output of the discriminative RNN at the time point t, l being a positive integer and representing a length of the sentence sample, $L_{adv}$ representing the discrimination loss, and n being a positive integer and representing a length of the sentence obtained through decoding.

18. The electronic device according to claim 10, further comprising:
reconstructing an image according to the sentence obtained through decoding;
determining a difference degree between the reconstructed image and the image sample; and
adjusting the discriminative RNN according to the difference degree.

* * * * *